(12) United States Patent
Uno et al.

(10) Patent No.: US 7,777,813 B2
(45) Date of Patent: Aug. 17, 2010

(54) COLOR BURST AUTOMATIC DETECTION DEVICE

(75) Inventors: Yasuhiro Uno, Kyoto (JP); Tooru Kusumi, Osaka (JP); Yuusuke Okumoto, Osaka (JP); Youichirou Mori, Osaka (JP)

(73) Assignee: Panasonic Corporation, Osaka (JP)

( * ) Notice: Subject to any disclaimer, the term of this patent is extended or adjusted under 35 U.S.C. 154(b) by 1056 days.

(21) Appl. No.: 11/492,965

(22) Filed: Jul. 26, 2006

(65) Prior Publication Data

US 2007/0052848 A1   Mar. 8, 2007

(30) Foreign Application Priority Data

Sep. 7, 2005   (JP) .............................. 2005-258612

(51) Int. Cl.
*H04N 9/455* (2006.01)
*H04N 9/45* (2006.01)

(52) U.S. Cl. ...................... 348/506; 348/505; 348/524; 348/194; 348/555; 348/558

(58) Field of Classification Search ................. 348/506, 348/505, 509, 504, 558, 555, 554, 194, 521, 348/524, 525
See application file for complete search history.

(56) References Cited

U.S. PATENT DOCUMENTS

| 4,885,638 | A | * | 12/1989 | Bennett ...................... 348/536 |
| 5,012,327 | A | * | 4/1991 | Bishop ....................... 348/527 |
| 5,404,230 | A | * | 4/1995 | Hong .............................. 386/9 |
| 5,481,313 | A | * | 1/1996 | Kim ............................ 348/505 |
| 5,774,184 | A | * | 6/1998 | Murakami .................. 348/506 |
| 6,727,956 | B2 | * | 4/2004 | Suzuki et al. ............... 348/524 |

FOREIGN PATENT DOCUMENTS

JP   01252090 A   10/1989

* cited by examiner

*Primary Examiner*—David L Ometz
*Assistant Examiner*—Jean W Désir
(74) *Attorney, Agent, or Firm*—Steptoe & Johnson LLP (57) ABSTRACT

A synchronization separation circuit extracts a synchronization timing signal from a video signal, and a burst gate pulse generator generates a timing pulse signal for gating a color burst signal period. In the color burst signal period restricted by the timing pulse signal, a first counter counts up cycles of a color burst signal at a first timing as a rising edge of the color burst signal and a second counter counts up cycles of the color burst signal at a second timing as a falling edge of the color burst signal. A color burst determination circuit receives count values to determine presence/absence of a color burst signal superimposed on the video signal.

30 Claims, 8 Drawing Sheets

COLOR BURST AUTOMATIC DETECTION DEVICE

BACKGROUND OF THE INVENTION

1. Field of the Invention

The present invention relates to a color burst automatic detection device for determining whether a form of a video signal inputted to a video signal receiving apparatus such as a TV set is a composite signal containing a color burst signal, a color signal and a synchronization signal each superimposed on a luminance signal or a component signal containing only a synchronization signal superimposed on a luminance signal.

2. Description of the Related Art

JP01-252090A discloses a signal detection circuit as one example of a well-known color burst automatic detection device for determining presence/absence of a color burst signal superimposed on a video signal.

This well-known signal detection circuit includes an ID synchronization detection circuit for receiving a color signal, a reference signal of a color carrier, and a burst gate pulse indicating a color burst signal period, and performing ID synchronization detection between a color burst signal contained in the color signal and the reference signal in accordance with the burst gate pulse, and a smoothing capacitor for smoothing an ID synchronization detection output from the ID synchronization detection circuit.

The well-known signal detection circuit also includes a circuit for generating a negative burst ID pulse in a period in which the ID synchronization detection output smoothed by the smoothing capacitor is smaller than a reference voltage V2, that is, when a synchronization state between the color burst signal contained in the color signal and the reference signal is not normal, and generating a positive burst ID pulse in a period in which the smoothed ID synchronization detection output is larger than a reference voltage V1, that is, when the synchronization state between the color burst signal contained in the color signal and the reference signal is normal.

The well-known signal detection circuit also includes a first counter reset by a reference pulse with a predetermined frequency (e.g., 60 Hz) or the negative burst ID pulse to count the positive burst ID pulse, and outputting a pulse when a count value reaches a predetermined value, a second counter reset by the reference pulse to count the pulse outputted from the first counter, and a hold circuit for holding a count output of the second counter by the reference pulse immediately before reset of the second counter, determining that a color signal (a color burst signal) is present when the held value is not less than a predetermined value, determining that a color signal (a color burst signal) is absent when the held value is less than the predetermined value, and outputting a determination output signal.

With the aforementioned configuration, the well-known signal detection circuit generates a positive burst ID pulse and a negative burst ID pulse, allows the first counter and the second counter to count the continuity and the number of pulses, allows the hold circuit to hold count values, and determines the count values. Thus, the well-known signal detection circuit determines presence/absence of a color burst signal.

According to this method, it is possible to determine whether a form of a video signal to be inputted is a composite signal or a component signal.

However, the well-known signal detection circuit has the following problems.

In the well-known signal detection circuit, first, the ID synchronization detection circuit performs ID synchronization detection between a color burst signal contained in a color signal and a reference signal in a burst gate pulse period. Therefore, a voltage to be charged to the smoothing capacitor largely varies due to a phase difference of the reference signal relative to the color burst signal contained in the color signal. In addition, it is impossible to determine whether a video signal to be inputted is a composite signal or a component signal in one horizontal blanking period. Consequently, it is necessary to count a detection pulse over plural horizontal blanking periods.

Further, the well-known signal detection circuit requires the first counter, the second counter and the hold circuit in addition to the ID synchronization detection circuit, resulting in large circuit scale.

In the well-known signal detection circuit, moreover, a reference signal to be inputted to the ID synchronization detection circuit is a fixed signal. Therefore, if a reference signal has a frequency of, for example, 3.58 MHz, a NTSC video signal must be inputted. On the other hand, if a reference signal has a frequency of, for example, 4.43 MHz, a PAL video signal must be inputted. Thus, the well-known signal detection circuit cannot be respond to a case of reception of multi-broadcasting. If the ID synchronization detection circuit is made to correspond to both a reference signal with a frequency of 3.58 MHz and a reference signal with a frequency of 4.43 MHz, a circuit scale thereof is further increased.

In addition, a timing at which a color burst signal is superimposed is replaced, in many cases, with a DC voltage near a pedestal level after color demodulation is performed using a composite signal. Such timing has a DC offset relative to the pedestal level. Consequently, if the well-known signal detection circuit receives a luminance signal having a DC offset in a color burst period, it is determined as if a color burst signal is constantly present by the detection of a DC offset portion and a reference signal.

SUMMARY OF THE INVENTION

The present invention is made to solve the aforementioned problems, and it is therefore an object of the present invention to provide a color burst automatic detection device capable of determining a form of a video signal to be inputted in one horizontal blanking period, requiring no switch between a reference signal with a frequency of 3.58 MHz and a reference signal with a frequency of 4.43 MHz, and stably making a determination on a signal form without erroneous operation with respect to a noise component such as a clamp level.

In order to achieve this object, the present invention provides a color burst automatic detection device comprising: a synchronization separation circuit for extracting a synchronization signal timing signal from a video signal inputted; a burst gate pulse generator for receiving the synchronization signal timing signal extracted by the synchronization separation circuit and a reference clock signal, and generating a timing pulse signal for gating a color burst signal period; a first counter for receiving the video signal and the timing pulse signal generated by the burst gate pulse generator, and counting up a color burst signal present in a burst gate pulse period at a first timing in the video signal; a second counter for receiving the video signal and the timing pulse signal generated by the burst gate pulse generator, and counting up a color burst signal present in the burst gate pulse period at a second timing different from the first timing in the video signal; a switch control circuit for controlling the respective operation timings of the first and second counters; and a color burst determination circuit for receiving count values outputted from the first and second counters to determine presence/absence of a color burst signal superimposed on the video signal, and determining whether the inputted video signal is a composite signal or a component signal.

According to this configuration, each of the first and second counters counts up the number of cycles of a color burst signal in one horizontal blanking period. The color burst determination circuit determines count values outputted from the first and second counters. Thus, it is possible to determine whether a video signal inputted is a composite signal or a component signal in one horizontal blanking period, thereby allowing it to determine the signal formation in one horizontal period.

In the present invention, the color burst automatic detection device may further comprise a bandpass filter for restricting a band of the video signal to be inputted, and an amplifier for amplifying the video signal having the band restricted by the bandpass filter to output the amplified video signal to the first counter and the second counter, respectively.

According to this configuration, before counting operations by the first counter and the second counter, the bandpass filter restricts a band of a color burst signal with a single carrier, and the amplifier amplifies an output signal at a high level in a burst gate pulse period in which a color burst signal is superimposed on a video signal inputted. Thus, a rising edge at which the first counter performs a counting operation and a falling edge at which the second counter performs accounting operation are emphasized. Accordingly, it is possible to stably extract only an edge timing of a color burst signal using the emphasized edge timing in each of the first counter and the second counter, and to stably perform a counting operation using this extracted edge timing.

In the present invention, the color burst determination circuit may have an added function of detecting which one of the first counter and the second counter initially counts up a color burst signal in successive horizontal scans, for each horizontal scan, based on the count values outputted from the first counter and the second counter, and outputting such determination information. Further, the color burst automatic detection device may further comprise a color system determination circuit for checking initial determination information outputted from the color burst determination circuit for not less than two horizontal scans, determining the video signal as a NTSC composite signal when the determination information is of only a same one of the first counter and the second counter every time, determining the video signal as a PAL composite signal when the determination information changes alternately for each horizontal scan, and detecting a phase switch timing of a color burst signal for each horizontal scan when the video signal is the PAL composite signal.

According to this configuration, it is possible to determine for each horizontal scan that which one of a first counter output signal and a second counter output signal is initially inputted. If the video signal inputted is a composite signal, it is possible to determine whether the composite signal is of a PAL system or of a NTSC system, based on the determination information. Moreover, if the video signal inputted is a PAL composite signal, a counter output changes alternately for each horizontal scan, therefore, it is possible to detect a phase switch timing of a color burst signal for each horizontal scan.

DESCRIPTION OF THE PREFERRED EMBODIMENTS

Hereinafter, description will be given of preferred embodiments of the present invention with reference to the drawings.

First Embodiment

Figure 1:
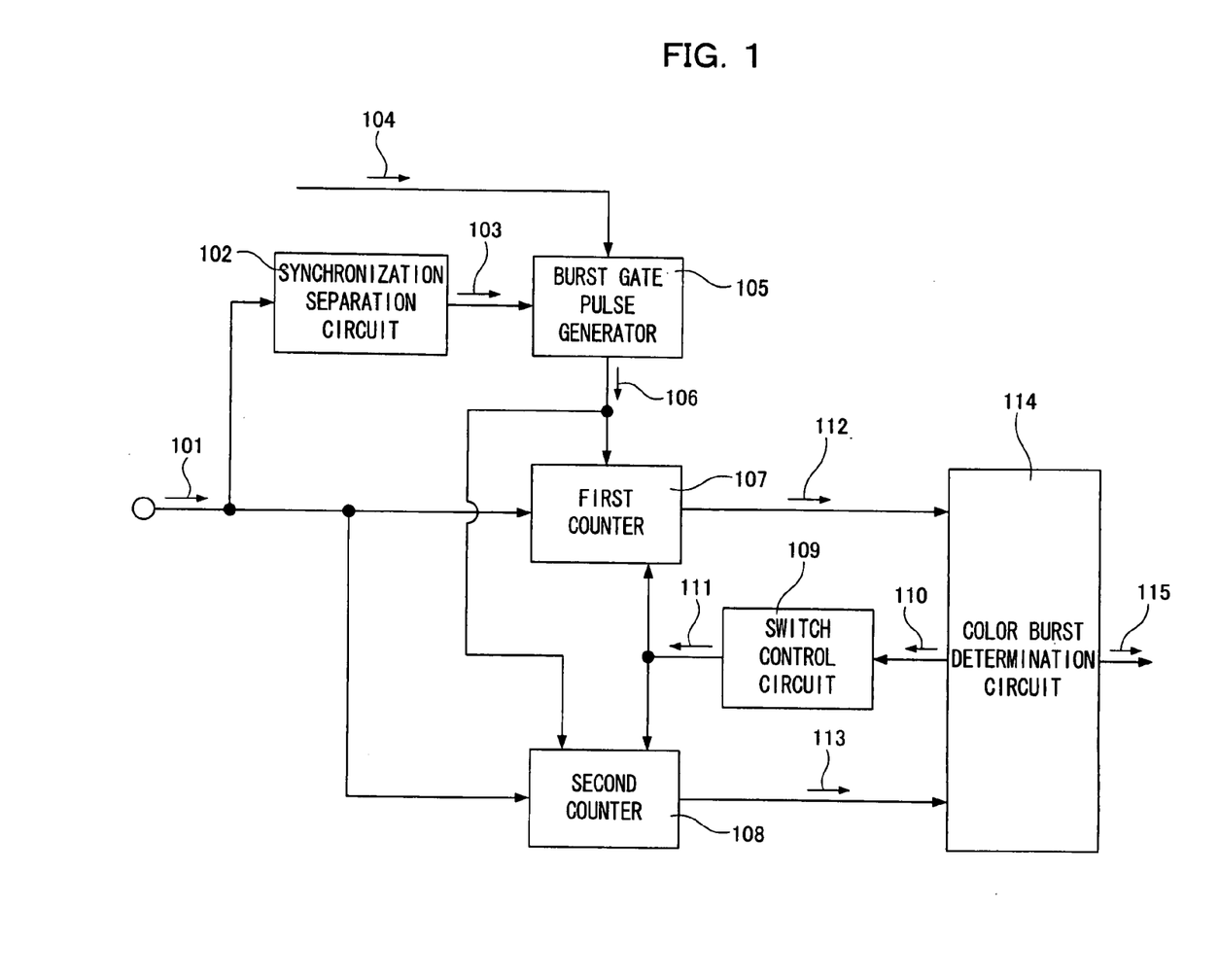
FIG. 1 is a circuit diagram illustrating a color burst automatic detection device according to a first embodiment of the present invention.

FIG. 1 is a circuit diagram illustrating a color burst automatic detection device according to a first embodiment of the present invention.

As illustrated in FIG. 1, the color burst automatic detection device includes a synchronization separation circuit 102, a burst gate pulse generator 105, a first counter 107, a second counter 108, a switch control circuit 109 and a color burst determination circuit 114.

The synchronization separation circuit 102 receives a video signal 101, extracts a synchronization signal timing from the video signal 101, and outputs a synchronization signal timing signal 103 to the burst gate pulse generator 105.

The burst gate pulse generator 105 receives the synchronization signal timing signal 103 extracted by the synchronization separation circuit 102 and a reference clock signal 104 supplied separately to generate a burst gate timing pulse signal 106 for gating a color burst signal period, and outputs the burst gate timing pulse signal 106 to the first counter 107 and the second counter 108, respectively.

The first counter 107 receives the video signal 101, the burst gate timing pulse signal 106 generated by the burst gate pulse generator 105, and a counter control signal 111 (to be described later) generated by the switch control circuit 109. When the counter control signal 111 is operated at a first timing (to be described later) in the video signal 101, the first counter 107 counts up (performs a counting operation on) a color burst signal present in the video signal 101 in a color burst signal period restricted by the burst gate timing pulse signal 106, and outputs a first counter output signal (a count value) 112 to the color burst determination circuit 114.

Similarly, the second counter 108 receives the video signal 101, the burst gate timing pulse signal 106 generated by the burst gate pulse generator 105, and the counter control signal 111 (to be described later) generated by the switch control circuit 109. When the counter control signal 111 is operated at a second timing (to be described later) different from the first timing in the video signal 101, the second counter 108 counts up (performs a counting operation on) a color burst signal present in the video signal 101 in a color burst signal period restricted by the burst gate timing pulse signal 106, and outputs a second counter output signal (a count value) 113 to the color burst determination circuit 114.

The switch control circuit 109 receives a count update pulse signal 110 (to be described later) from the color burst determination circuit 114. Based on the received count update pulse signal 110, the switch control circuit 109 outputs the counter control signal 111 for controlling the first counter 107 and the second counter 108 (detailed description thereof will be given later).

The color burst determination circuit 114 receives the first counter output signal 112 outputted from the first counter 107, and the second counter output signal 113 outputted from the second counter 108. Based on whether or not each of the received first counter output signal (the count value) 112 and the second counter output signal (the count value) 113 outputted from the second counter 108 exceeds a threshold value (a predetermined count value; to be described later) for making a determination about a preset composite signal or component signal, the color burst determination circuit 114 determines whether the inputted video signal 101 is a composite signal or a component signal, and outputs a determination output signal 115. Each time the count value of one of the two counter output signals 112 and 113 increases, the color burst determination circuit 114 outputs the count update pulse signal 110 to the switch control circuit 109. As described above, the color burst determination circuit 114 determines whether the video signal 101 inputted in one horizontal blanking period is a composite signal or a component signal.

(First Timing, Second Timing)

Next, description will be given of details of the first timing (a timing at which the first counter 107 performs a counting operation) and the second timing (a timing at which the second counter 108 performs a counting operation) with reference to FIG. 2.

Figure 2:
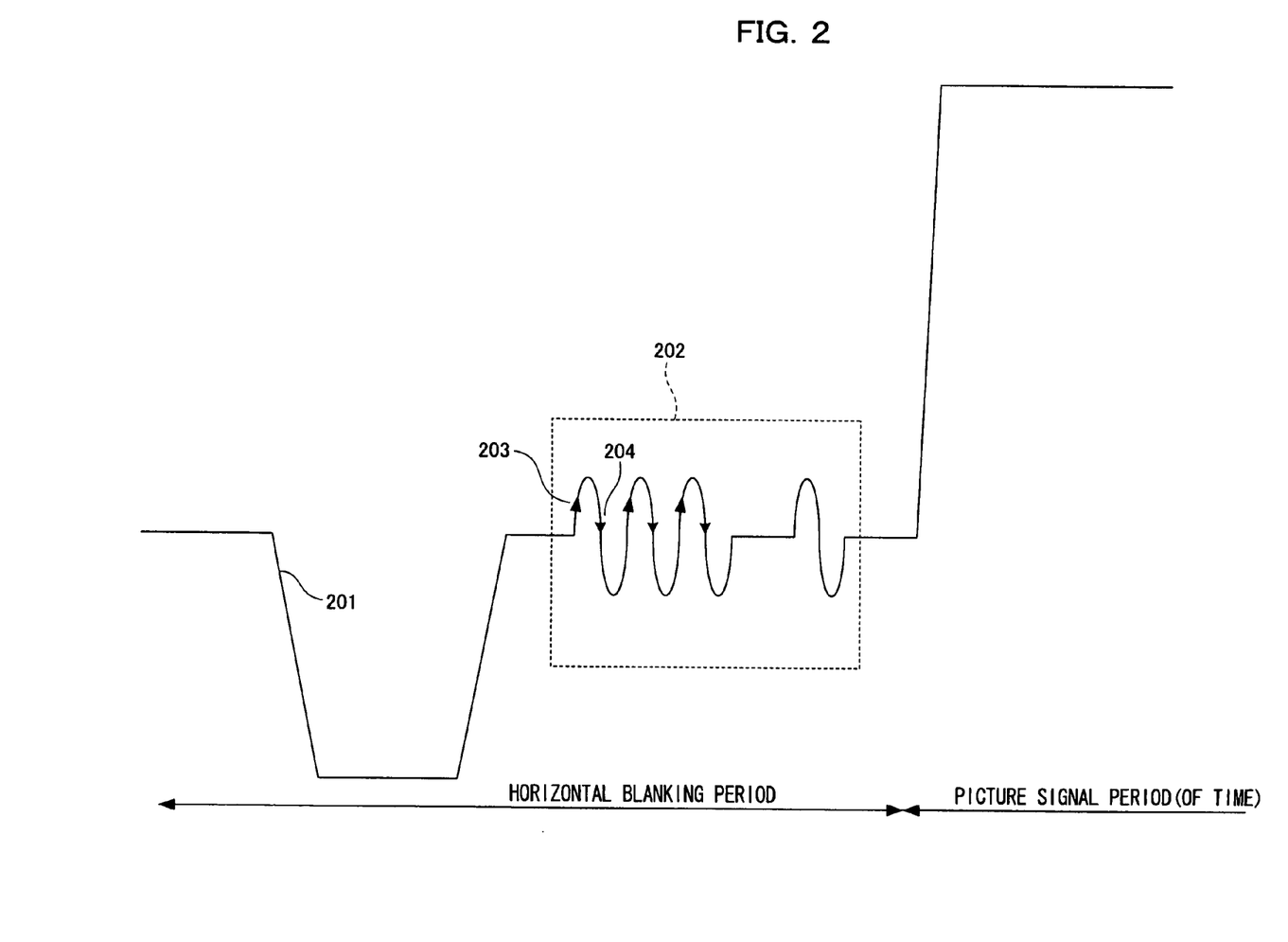
FIG. 2 illustrates a characteristic of a composite signal of the color burst automatic detection device in a horizontal blanking period.

FIG. 2 illustrates a horizontal blanking period of a composite signal. A color burst signal 202 is superimposed on aback porch portion of a synchronization signal 201. A PAL color burst signal has a sine wave with a single carrier frequency of 4.43 MHz and a NTSC color burst signal has a sine wave with a single carrier frequency of 3.58 MHz. Herein, a rising edge 203 of this sine wave is the first timing and a falling edge 204 is the second timing. It is to be noted that the first timing may be a falling edge of a color burst signal and the second timing may be a rising edge of the color burst signal.

As described above, the first timing is the rising edge 203 and the second timing is the falling edge 204, so that the first counter 107 and the second counter 108 are allowed to operate alternately and successively. As for a PAL signal, for example, one color burst signal has 10±1 cycles of continuous sine waves; therefore, each of the first counter 107 and the second counter 108 has a count value of 10±1 for one color burst signal.

In case of a PAL signal, when it is assumed that the color burst determination circuit 114 adds a count value outputted from the first counter 107 to a count value outputted from the second counter 108 to determine whether a color burst signal is a composite signal or a component signal, the threshold value (the optional count value) is set at an integer in a range between not less than 1 and not more than 20.

(Switch Control Circuit 109)

Figure 3:
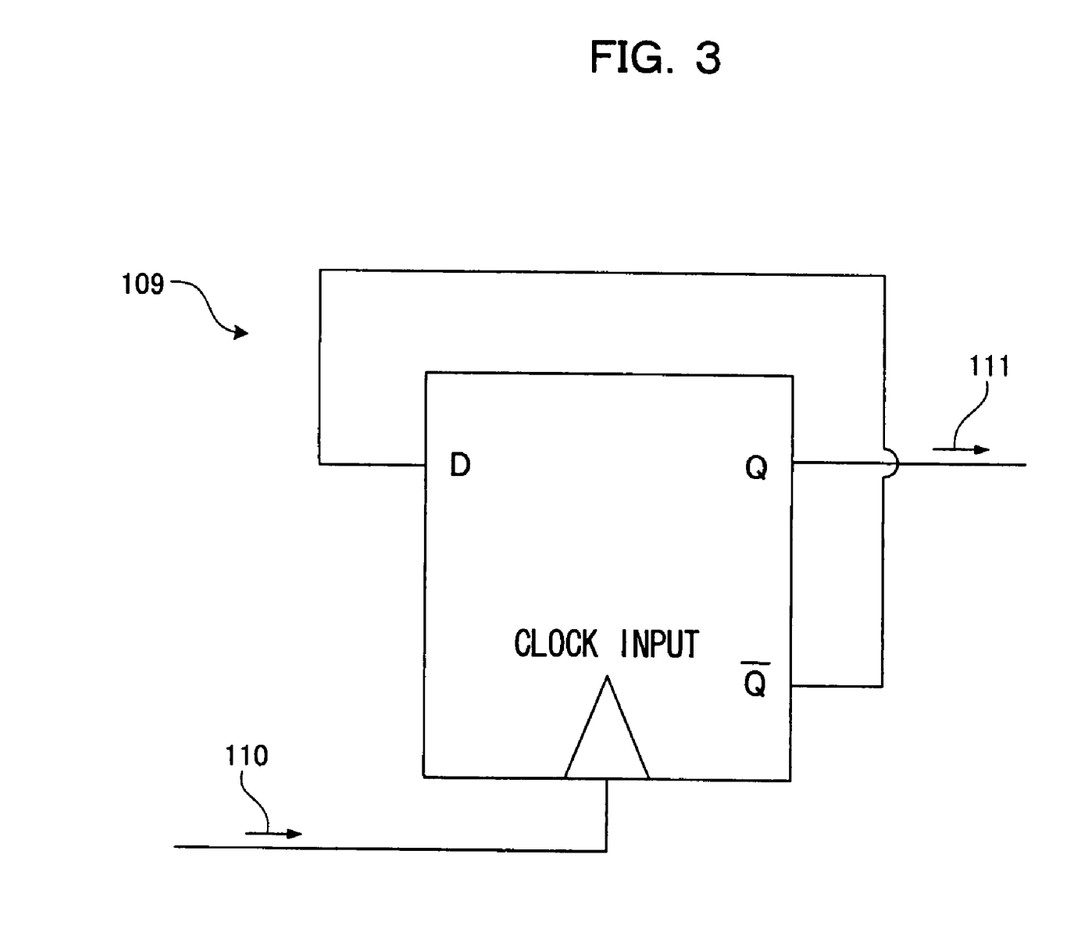
FIG. 3 illustrates a configuration of a switch control circuit of the color burst automatic detection device.

As illustrated in FIG. 3, for example, the switch control circuit 109 is configured by a ½ frequency divider including a simple D flip-flop. As illustrated in FIG. 3, the switch control circuit 109 receives, as a clock input, the count update pulse signal 110 outputted from the color burst determination circuit 114. Each time the switch control circuit 109 receives the count update pulse signal 110, an inverted output of Q is inputted to a D input. Thus, each time the switch control circuit 109 receives the count update pulse signal 110, the counter control signal 111 as a Q output is set at a Low level and a High level repeatedly. Accordingly, for example, when the counter control signal 111 is at a Low level, the first counter 107 is operable. On the other hand, when the counter control signal 111 is at a High level, the second counter 108 is operable. With these settings, it is possible to alternately operate the first counter 107 and the second counter 108 without simultaneously operating the first counter 107 and the second counter 108.

As described above, the counter control signal 111 is used for alternately operating the first counter 107 and the second counter 108 without simultaneously operating the first counter 107 and the second counter 108. Thus, even when disturbance noise is superimposed on a color burst signal, it is possible to prevent the counting operations of the first and second counters 107 and 108 from being performed at random due to noise (to prevent an erroneous operation) and to stably perform the counting operations by means of a form of a sine wave constituting a color burst signal. This effect will be described with reference to FIG. 4.

Figure 4:
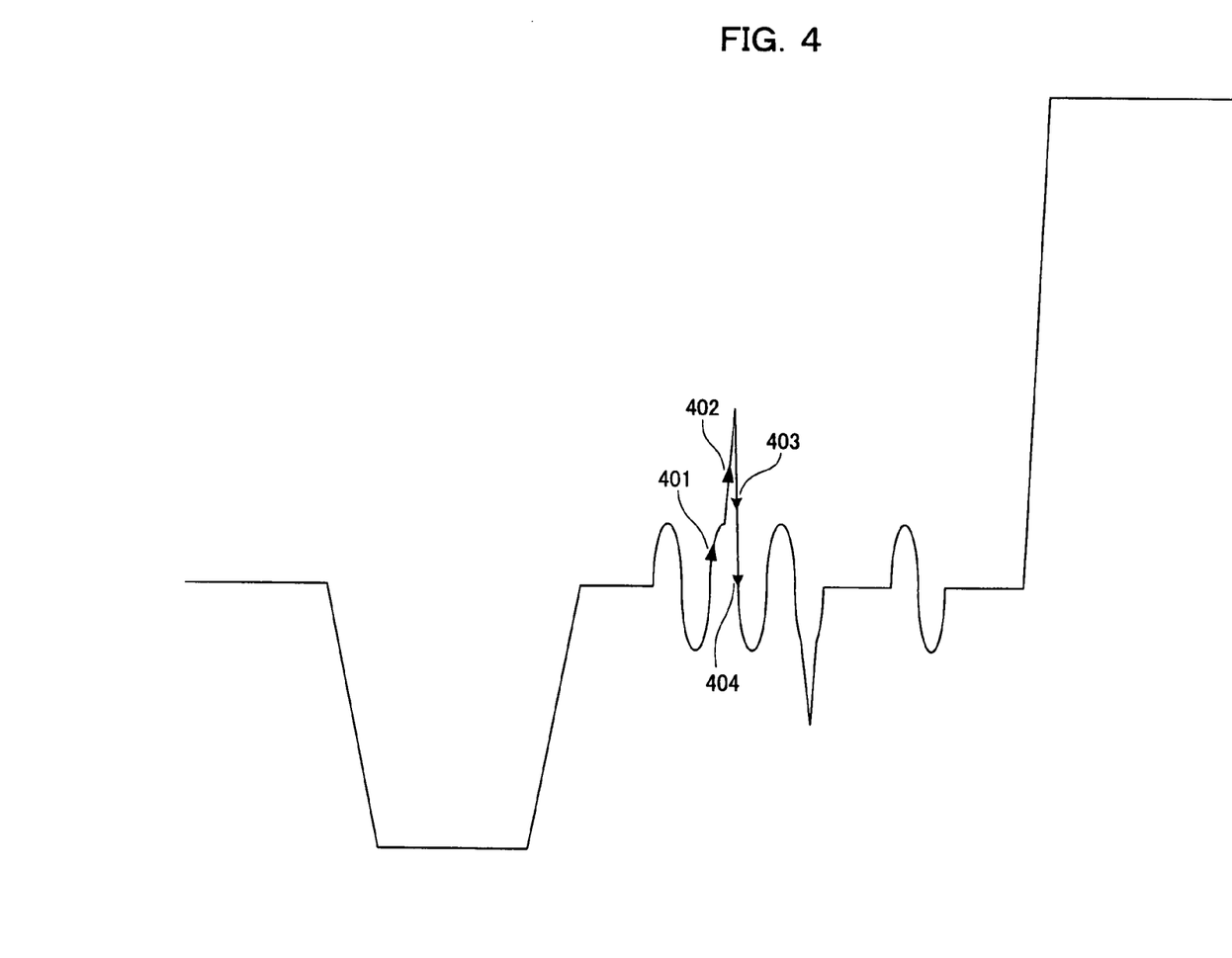
FIG. 4 illustrates a characteristic of a composite signal of the color burst automatic detection device, in which disturbance noise is superimposed on a color burst signal.

FIG. 4 illustrates a composite signal in which disturbance noise is superimposed on a color burst signal. At a rising edge 401, the first counter 107 must perform a counting operation normally. Even when a rising edge 402 generated by disturbance noise is produced subsequent to the rising edge 401, a counting operation is performed only in a falling edge next under control by the switch control circuit 109; therefore, the first counter 107 does not perform a counting operation. At a falling edge 403 generated by disturbance noise, next, the second counter 108 normally performs accounting operation. Therefore, even when a normal falling edge 404 is produced subsequent to the falling edge 403, the second counter 108 does not perform a counting operation by an instruction from the switch control circuit 109. However, since only one counting operation is performed at the falling edges 403 and 404, there arises no problem in regard to a falling count.

As described above, the first counter 107 and the second counter 108 count up the number of cycles of a color burst signal in one horizontal blanking period, and the color burst determination circuit 114 determines these count values based on the threshold value. Thus, it is possible to determine whether a video signal inputted in one horizontal blanking period is a composite signal or a component signal.

In addition, the synchronization separation circuit 102 extracts a synchronization signal timing from the inputted video signal 101. Thus, a color burst signal can respond to a NTSC signal with a frequency of 3.58 MHz and a PAL signal with a frequency of 4.43 MHz without having a PLL synchronization detection system and without switching between a reference clock signal 104 with a frequency of 3.58 MHz and a reference clock signal 104 with a frequency of 4.43 MHz. Therefore, it is possible to reduce a circuit scale of a detection system.

Further, the counter control signal 111 is used for controlling alternate operations of the first counter 107 and the second counter 108 without simultaneous operation of the first counter 107 and the second counter 108. Thus, it is possible to stably determine a form of an input signal without influence of a clamp level or disturbance noise.

Second Embodiment

Figure 5:
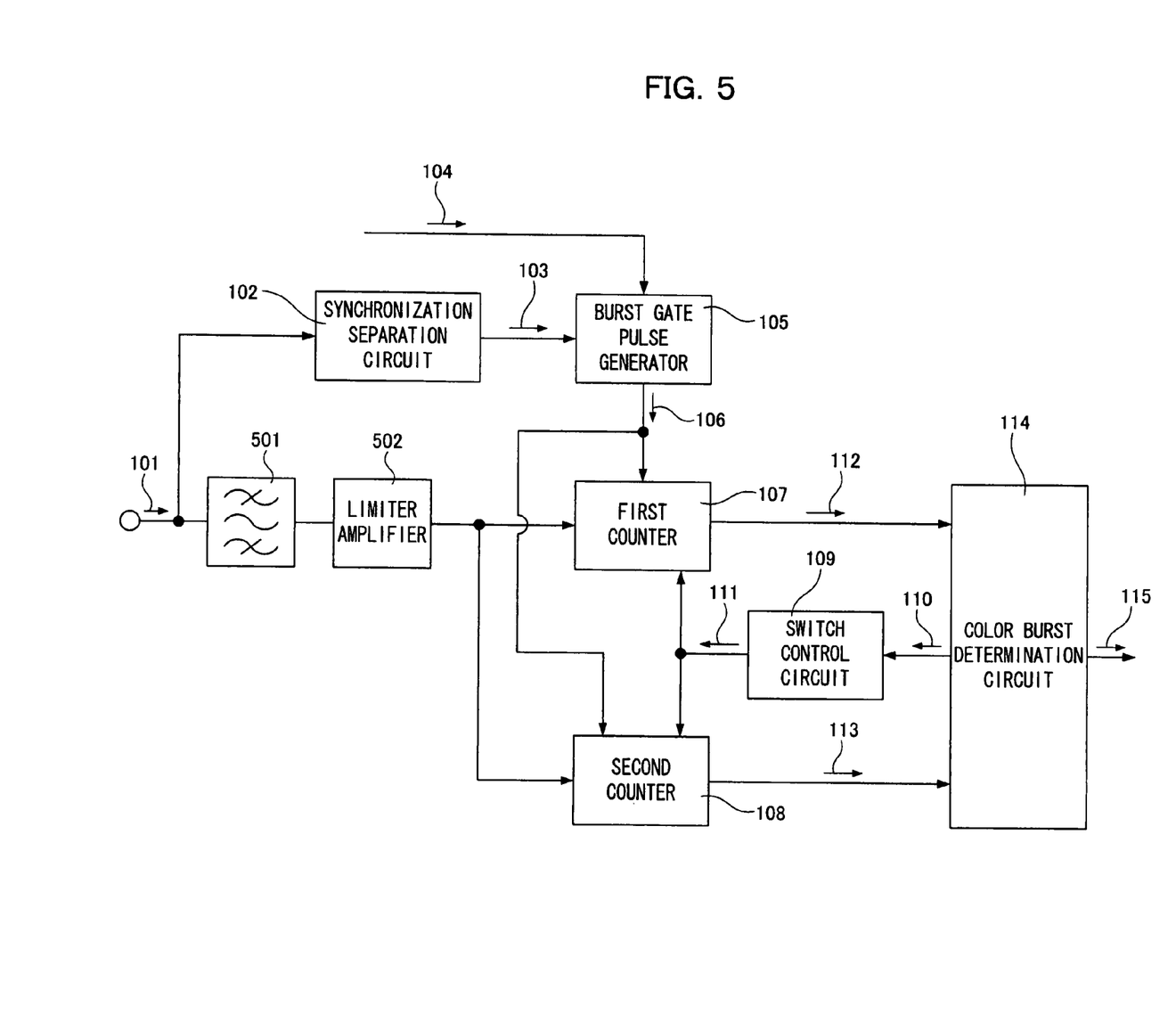
FIG. 5 is a circuit diagram illustrating a color burst automatic detection device according to a second embodiment of the present invention.

FIG. 5 is a circuit diagram illustrating a color burst automatic detection device according to a second embodiment of the present invention. It is to be noted that constituent elements equal to those in the first embodiment are denoted by the same reference numerals; therefore, specific description thereof will not be given here.

As illustrated in FIG. 5, in addition to a synchronization separation circuit 102, a burst gate pulse generator 105, a first counter 107, a second counter 108, a switch control circuit 109 and a color burst determination circuit 114, the color burst automatic detection device in the second embodiment newly includes a bandpass filter 501 and a limiter amplifier 502 at a front stage of the first counter 107 and the second counter 108.

The bandpass filter 501 restricts a band of a video signal 101 to be inputted, and filters only a color burst signal with a single carrier.

The limiter amplifier 502 amplifies a color burst signal outputted from the bandpass filter 501, and outputs the resultant to the first counter 107 and the second counter 108, respectively.

With this configuration, before counting operations by the first counter 107 and the second counter 108, the bandpass filter 501 restricts a band of a color burst signal with a single carrier and the limiter amplifier 502 amplifies an output signal at a high level in a burst gate pulse period in which a color burst signal is superimposed on the video signal 101 to be inputted. Thus, a rising edge at which the first counter 107 performs a counting operation and a falling edge at which the second counter 108 performs a counting operation are emphasized. Accordingly, it is possible to stably extract only an edge timing of a color burst signal using an emphasized edge timing in the first counter 107 and the second counter 108, and to stably perform a counting operation using this extracted edge timing.

Third Embodiment

In case of inputting a composite signal, it is possible to detect whether a video signal to be inputted is a NTSC composite signal or a PAL composite signal by detecting that which one of a first counter 107 and a second counter 108 initially counts up a color burst signal in successive horizontal scans, for each horizontal scan.

Figure 6:
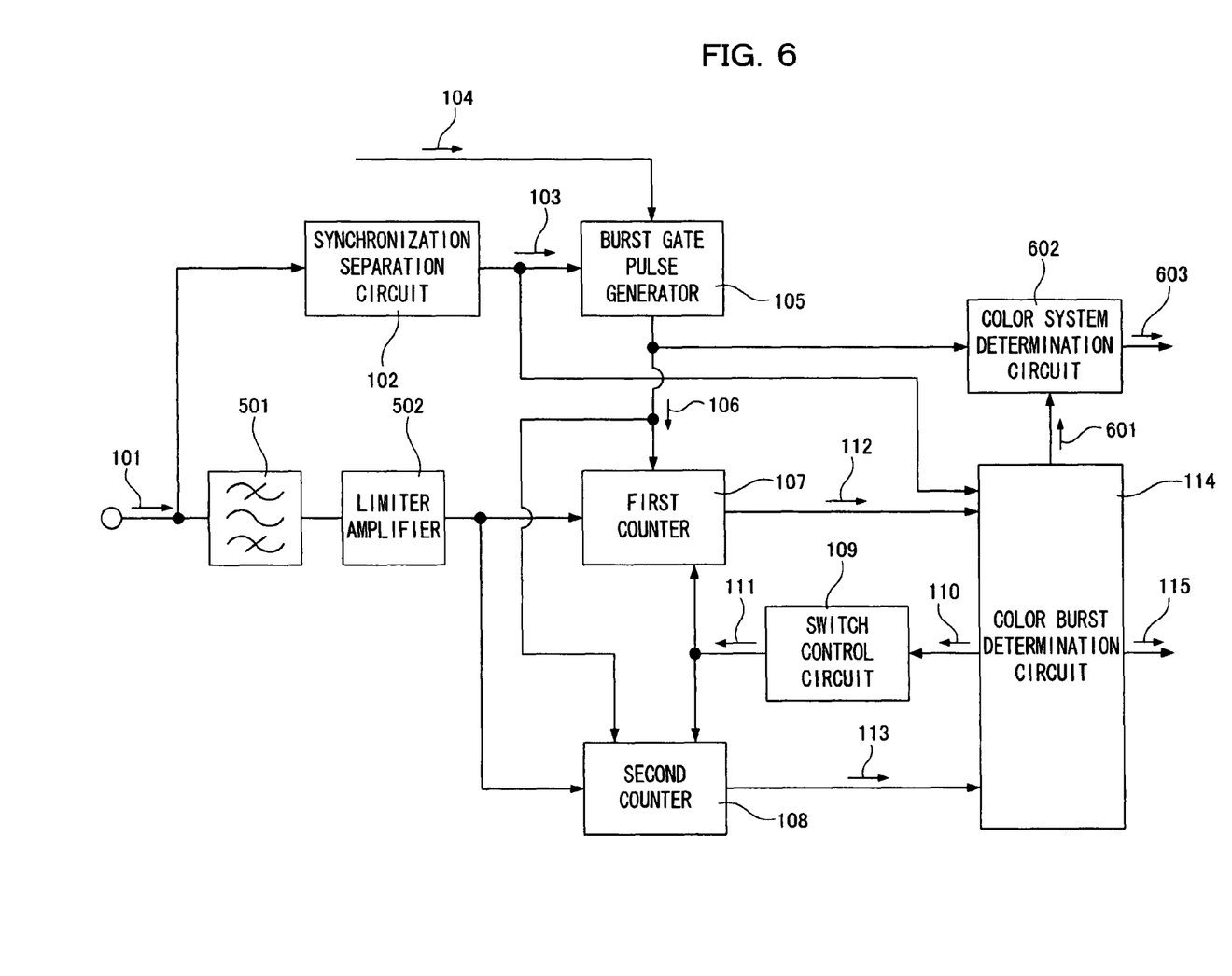
FIG. 6 is a circuit diagram illustrating a color burst automatic detection device according to a third embodiment of the present invention.

FIG. 6 is a circuit diagram illustrating a color burst automatic detection device having the aforementioned detecting function according to a third embodiment of the present invention. It is to be noted that constituent elements equal to those in the second embodiment are denoted by the same reference numerals; therefore, specific description thereof will not be given here.

As illustrated in FIG. 6, in addition to a synchronization separation circuit 102, a burst gate pulse generator 105, a first counter 107, a second counter 108, a switch control circuit 109, a color burst determination circuit 114, a bandpass filter 501 and a limiter amplifier 502, the color burst automatic detection device according to the third embodiment newly includes a color system determination circuit 602. The color burst determination circuit 114 receives a synchronization signal timing signal 103.

After reception of the synchronization signal timing signal 103, the color burst determination circuit 114 determines that which one of a first counter output signal 112 and a second counter output signal 113 is initially inputted. More specifically, if a composite signal is inputted as a video signal 101, the color burst determination circuit 114 determines that which one of the first counter 107 and the second counter 108 initially counts up a color burst signal in successive horizontal scans, for each horizontal scan, based on count values outputted from the first counter 107 and the second counter 108. Then, the color burst determination circuit 114 outputs determination information (a determination signal) 601 to the color system determination circuit 902.

In case of a NTSC system, determination information 601 is of one of the first counter 107 and the second counter 108 every time. In case of a PAL system, the first counter 107 and the second counter 108 alternately output a count value for each horizontal scan. The color system determination circuit 602 checks the determination information 601 outputted from the color burst determination circuit 114 over at least two horizontal scans. If determination information 601 is outputted from a single counter every time, the color system determination circuit 602 determines, as a NTSC composite signal, a video signal to be inputted. On the other hand, if determination information 601 is outputted alternately for each horizontal scan, the color system determination circuit 602 determines, as a PAL composite signal, a video signal to be inputted. Then, the color system determination circuit 602 outputs a color determination output signal 603 for making a determination whether a PAL signal or a NTSC signal. Further, if the video signal to be inputted is determined as a PAL composite signal, the color system determination circuit 602 detects a phase switch timing of a color burst signal for each horizontal scan.

As described above, it is possible to determine for each horizontal scan that which one of the first counter output signal 112 and the second counter output signal 113 is initially inputted. If a video signal 101 to be inputted is a composite signal, it is possible to determine whether the composite signal is of a PAL system or of a NTSC system, based on the determination information. Moreover, if the video signal 101 to be inputted is a PAL composite signal, a counter output is alternately changed for each horizontal scan; therefore, it is possible to detect a phase switch timing of a color burst signal for each horizontal scan.

Another Embodiment

In the aforementioned first to third embodiments, the first counter 107 and the second counter 108 perform a counting operation at the rising edge 203 and the falling edge 204 of a sine wave (a color burst signal), respectively. There is considered the following methods as such a counting operation.

Figure 7:
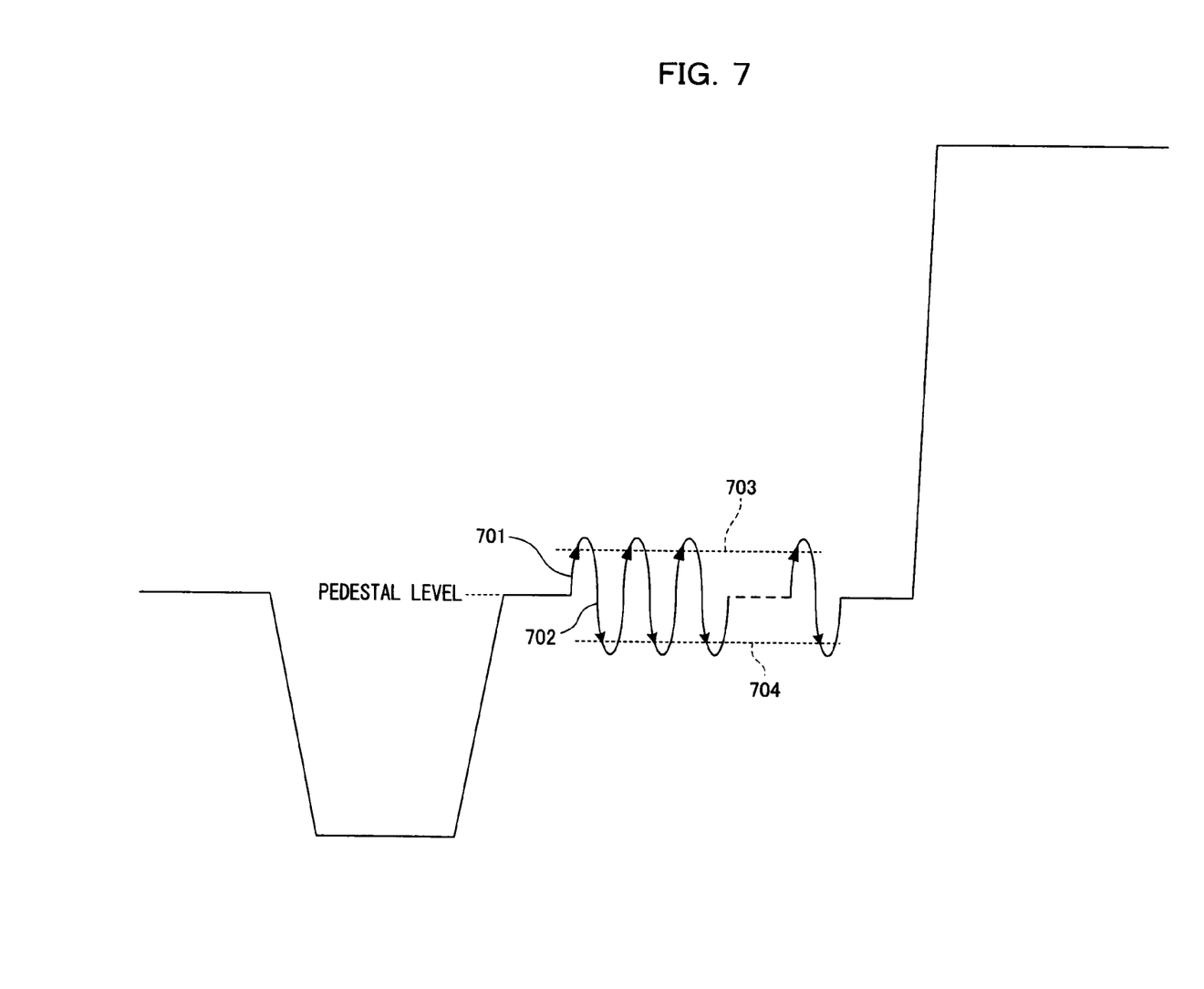
FIG. 7 illustrates a timing at which a color burst automatic detection device according to another embodiment of the present invention counts up a color burst signal.

(A) First, there is considered a method illustrated in FIG. 7. In a color burst signal in FIG. 7, a rising edge 701 above a pedestal level is used as a first timing, and a falling edge 702 below the pedestal level is used as a second timing.

According to this method, a counting operation is performed in such a manner that a characteristic of a sine wave as a single carrier of a color burst signal is checked. Therefore, it is possible to stably detect a color burst signal without influence of disturbance noise or clamp damage.

In this method, the rising edge above the pedestal level may be used as a second timing and the falling edge below the pedestal level may be used as a first timing.

(B) If the rising edge 701 above the pedestal level exceeds a threshold value 703 thereof shown by a broken line in FIG. 7, a counting operation is performed. Further, if the falling edge 702 below the pedestal level exceeds a threshold value 704 thereof also shown by a broken line in FIG. 7, a counting operation is performed.

Figure 8:
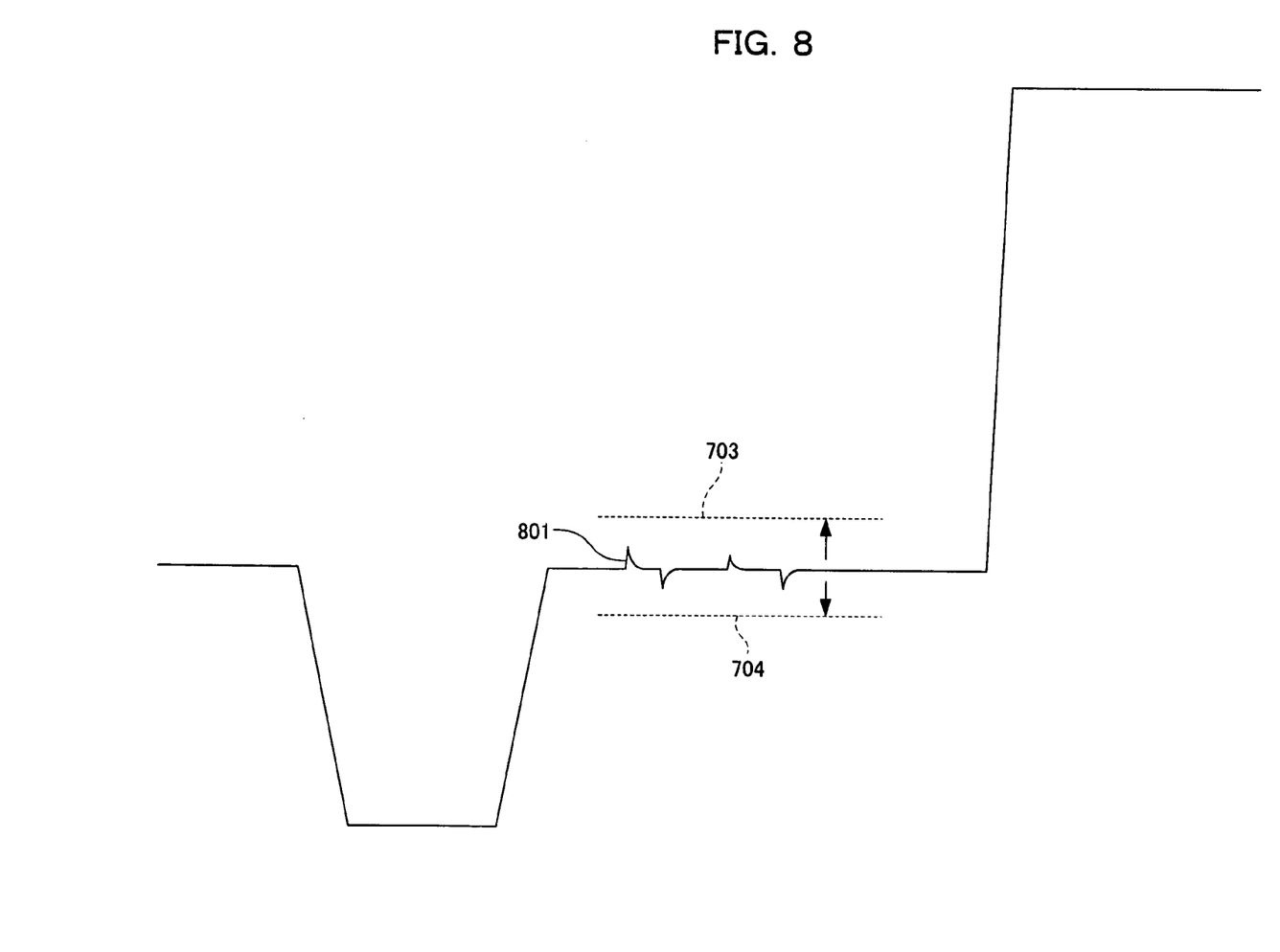
FIG. 8 illustrates a characteristic of a component luminance signal with a clamp damage of the color burst detection device.

A distance from the threshold value 703 to the pedestal level and a distance from the threshold value 704 to the pedestal level are variable, respectively. Since the distance from the threshold value 703 of the rising edge 701 above the pedestal level to the pedestal level and the distance from the threshold value 704 of the falling edge 702 below the pedestal level to the pedestal level are variable, respectively, it is possible to perform a counting operation without error due to a noise component near the pedestal level. As illustrated in FIG. 8, for example, a luminance signal subjected to Y/C separation and burst removal in video signal processing has a clamp damage 801 or a damage generated when a color burst signal is removed from the luminance signal and, then, a DC voltage is inserted in place of the color burst signal into the luminance signal, in some cases. In this case, there is a possibility that a counting operation is erroneously performed due to a clamp damage or spike noise generated upon replacement of a DC voltage. Basically, a signal from which a color burst signal and a chrominance signal are removed must be determined as a component signal. To this end, there is considered a method of performing filtering processing at a front stage of a color burst automatic detection device to remove spike noise triggering an erroneous counting operation. By using threshold values 703 and 704 for performing a counting operation as variables from a pedestal level, it is possible to prevent a counting operation from being performed erroneously due to noise near the pedestal level.

In the aforementioned first to third embodiments, if the color burst determination circuit 114 determines whether the inputted video signal 101 is a composite signal or a component signal only in a vertical blanking period and makes no determination in an effective screen period, it is possible to prevent switch noise of the determination output signal 115 outputted from the color burst determination signal 114 from reflecting on an effective screen.

Also in the aforementioned first to third embodiments, if the color burst automatic detection device according to the present invention receives a SECAM composite signal, there is a possibility that a chrominance subcarrier superimposed on a back porch portion of a horizontal synchronization signal is erroneously determined as a PAL color burst signal. However, a color determination signal is superimposed on a SECAM signal in a vertical blanking period. This color determination signal is detected separately; thus, it is possible to prevent erroneous determination that a PAL composite signal is inputted.

What is claimed is:

1. A color burst automatic detection device comprising:
a synchronization separation circuit for extracting a synchronization signal timing signal from a video signal inputted;
a burst gate pulse generator for receiving the synchronization signal timing signal extracted by the synchronization separation circuit and a reference clock signal, and generating a timing pulse signal for gating a color burst signal period;
a first counter for receiving the video signal and the timing pulse signal generated by the burst gate pulse generator, and counting up a color burst signal present in a burst gate pulse period at a first timing in the video signal;
a second counter for receiving the video signal and the timing pulse signal generated by the burst gate pulse generator, and counting up a color burst signal present in the burst gate pulse period at a second timing different from the first timing in the video signal;
a switch control circuit for controlling the respective operation timings of the first and second counters; and
a color burst determination circuit for receiving count values outputted from the first and second counters, determining presence/absence of a color burst signal superimposed on the video signal, and determining whether the inputted video signal is a composite signal or a component signal.

2. The color burst automatic detection device according to claim 1, wherein the switch control circuit controls the switch so that the first counter and the second counter perform a counting operation only when the first counter and the second counter operate alternately without operating simultaneously.

3. The color burst automatic detection device according to claim 1, wherein the color burst determination circuit determines that a color burst signal is superimposed on the video signal inputted, only when each of the count values of the first counter and the second counter is not less than an optional count value.

4. The color burst automatic detection device according to claim 1, wherein the first counter uses a rising edge of a color burst signal as a first timing for performing a counting operation, and the second counter uses a falling edge of a color burst signal as a second timing for operating a counting operation.

5. The color burst automatic detection device according to claim 1, wherein the first counter uses a falling edge of a color burst signal as a first timing for performing a counting operation, and the second counter uses a rising edge of a color burst signal as a second timing for operating a counting operation.

6. The color burst automatic detection device according to claim 1, wherein the first counter uses, in a counting operation thereof, a rising edge of a sine wave constituting a color burst signal above a pedestal level, and the second counter uses, in a counting operation thereof, a falling edge of a sine wave constituting a color burst signal below the pedestal level.

7. The color burst automatic detection device according to claim 6, wherein the first counter uses a distance from the pedestal level as a variable to determines an edge timing for performing a counting operation using the rising edge of the color burst signal, and the second counter uses a distance from the pedestal level as a variable to determine an edge timing for performing a counting operation using the falling edge of the color burst signal.

8. The color burst automatic detection device according to claim 1, wherein the first counter uses, in a counting operation thereof, a falling edge of a sine wave constituting a color burst signal above a pedestal level, and the second counter uses, in a counting operation thereof, a rising edge of a sine wave constituting a color burst signal below the pedestal level.

9. The color burst automatic detection device according to claim 8, wherein the first counter uses a distance from the pedestal level as a variable to determines an edge timing for performing a counting operation using the rising edge of the color burst signal, and the second counter uses a distance from the pedestal level as a variable to determine an edge timing for performing a counting operation using the falling edge of the color burst signal.

10. The color burst automatic detection device according to claim 1, wherein the color burst determination circuit determines whether the inputted video signal is a composite signal or a component signal only in a vertical blanking period, and makes no determination in an effective screen period.

11. A color burst automatic detection device comprising:
a synchronization separation circuit for extracting a synchronization signal timing signal from a video signal inputted;
a burst gate pulse generator for receiving the synchronization signal timing signal extracted by the synchronization separation circuit and a reference clock signal, and generating a timing pulse signal for gating a color burst signal period;
a bandpass filter for restricting a band of the video signal to be inputted;
an amplifier for amplifying the video signal having the band restricted by the bandpass filter;
a first counter for receiving the video signal amplified by the amplifier and the timing pulse signal generated by the burst gate pulse generator, and counting up a color burst signal present in a burst gate pulse period at a first timing in the video signal;
a second counter for receiving the video signal amplified by the amplifier and the timing pulse signal generated by the burst gate pulse generator, and counting up a color burst signal present in the burst gate pulse period at a second timing different from the first timing in the video signal;
a switch control circuit for controlling the respective operation timings of the first and second counters; and
a color burst determination circuit for receiving count values outputted from the first and second counters, determining presence/absence of a color burst signal superimposed on the video signal, and determining whether the inputted video signal is a composite signal or a component signal.

12. The color burst automatic detection device according to claim 11, wherein the switch control circuit controls the switch so that the first counter and the second counter perform a counting operation only when the first counter and the second counter operate alternately without operating simultaneously.

13. The color burst automatic detection device according to claim 11, wherein the color burst determination circuit determines that a color burst signal is superimposed on the video signal inputted, only when each of the count values of the first counter and the second counter is not less than an optional count value.

14. The color burst automatic detection device according to claim 11, wherein the first counter uses a rising edge of a color burst signal as a first timing for performing accounting operation, and the second counter uses a falling edge of a color burst signal as a second timing for operating a counting operation.

15. The color burst automatic detection device according to claim 11, wherein the first counter uses a falling edge of a color burst signal as a first timing for performing a counting operation, and the second counter uses a rising edge of a color burst signal as a second timing for operating a counting operation.

16. The color burst automatic detection device according to claim 11, wherein the first counter uses, in a counting operation thereof, a rising edge of a sine wave constituting a color burst signal above a pedestal level, and the second counter uses, in a counting operation thereof, a falling edge of a sine wave constituting a color burst signal below the pedestal level.

17. The color burst automatic detection device according to claim 16, wherein the first counter uses a distance from the pedestal level as a variable to determines an edge timing for performing a counting operation using the rising edge of the color burst signal, and the second counter uses a distance from the pedestal level as a variable to determine an edge timing for performing a counting operation using the falling edge of the color burst signal.

18. The color burst automatic detection device according to claim 11, wherein the first counter uses, in a counting operation thereof, a falling edge of a sine wave constituting a color burst signal above a pedestal level, and the second counter uses, in a counting operation thereof, a rising edge of a sine wave constituting a color burst signal below the pedestal level.

19. The color burst automatic detection device according to claim 18, wherein the first counter uses a distance from the pedestal level as a variable to determines an edge timing for performing a counting operation using the rising edge of the color burst signal, and the second counter uses a distance from the pedestal level as a variable to determine an edge timing for performing a counting operation using the falling edge of the color burst signal.

20. The color burst automatic detection device according to claim 11, wherein the color burst determination circuit determines whether the inputted video signal is a composite signal or a component signal only in a vertical blanking period, and makes no determination in an effective screen period.

21. A color burst automatic detection device comprising:
a synchronization separation circuit for extracting a synchronization signal timing signal from a video signal inputted;
a burst gate pulse generator for receiving the synchronization signal timing signal extracted by the synchronization separation circuit and a reference clock signal, and generating a timing pulse signal for gating a color burst signal period;
a bandpass filter for restricting a band of the video signal to be inputted;
an amplifier for amplifying the video signal having the band restricted by the bandpass filter;
a first counter for receiving the video signal amplified by the amplifier and the timing pulse signal generated by the burst gate pulse generator, and counting up a color burst signal present in a burst gate pulse period at a first timing in the video signal;
a second counter for receiving the video signal amplified by the amplifier and the timing pulse signal generated by the burst gate pulse generator, and counting up a color burst signal present in the burst gate pulse period at a second timing different from the first timing in the video signal;
a switch control circuit for controlling the respective operation timings of the first and second counters; and
a color burst determination circuit for receiving count values outputted from the first and second counters, determining presence/absence of a color burst signal superimposed on the video signal, and determining whether the inputted video signal is a composite signal or a component signal, wherein the color burst determination circuit has an added function of detecting which one of the first counter and the second counter initially counts up a color burst signal in successive horizontal scans, for each horizontal scan, based on the count values outputted from the first counter and the second counter, and outputting such determination information; and the color burst automatic detection device further comprises a color system determination circuit for checking initial determination information outputted from the color burst determination circuit for not less than two horizontal scans, determining the video signal as a NTSC composite signal when the determination information is of only a same one of the first counter and the second counter every time, determining the video signal as a PAL composite signal when the determination information changes alternately for each horizontal scan, and detecting a phase switch timing of a color burst signal for each horizontal scan when the video signal is the PAL composite signal.

22. The color burst automatic detection device according to claim 21, wherein the switch control circuit controls the switch so that the first counter and the second counter perform a counting operation only when the first counter and the second counter operate alternately without operating simultaneously.

23. The color burst automatic detection device according to claim 21, wherein the color burst determination circuit determines that a color burst signal is superimposed on the video signal inputted, only when each of the count values of the first counter and the second counter is not less than an optional count value.

24. The color burst automatic detection device according to claim 21, wherein the first counter uses a rising edge of a color burst signal as a first timing for performing a counting operation, and the second counter uses a falling edge of a color burst signal as a second timing for operating a counting operation.

25. The color burst automatic detection device according to claim 21, wherein the first counter uses a falling edge of a color burst signal as a first timing for performing a counting operation, and the second counter uses a rising edge of a color burst signal as a second timing for operating a counting operation.

26. The color burst automatic detection device according to claim 21, wherein the first counter uses, in a counting operation thereof, a rising edge of a sine wave constituting a color burst signal above a pedestal level, and the second counter uses, in a counting operation thereof, a falling edge of a sine wave constituting a color burst signal below the pedestal level.

27. The color burst automatic detection device according to claim 26, wherein the first counter uses a distance from the pedestal level as a variable to determines an edge timing for performing a counting operation using the rising edge of the color burst signal, and the second counter uses a distance from the pedestal level as a variable to determine an edge timing for performing a counting operation using the falling edge of the color burst signal.

28. The color burst automatic detection device according to claim 21, wherein the first counter uses, in a counting operation thereof, a falling edge of a sine wave constituting a color burst signal above a pedestal level, and the second counter uses, in a counting operation thereof, a rising edge of a sine wave constituting a color burst signal below the pedestal level.

29. The color burst automatic detection device according to claim 28, wherein the first counter uses a distance from the pedestal level as a variable to determines an edge timing for performing a counting operation using the rising edge of the color burst signal, and the second counter uses a distance from the pedestal level as a variable to determine an edge timing for performing a counting operation using the falling edge of the color burst signal.

30. The color burst automatic detection device according to claim 21, wherein the color burst determination circuit determines whether the inputted video signal is a composite signal or a component signal only in a vertical blanking period, and makes no determination in an effective screen period.

* * * * *